United States Patent
Sander

Patent Number: 5,169,701
Date of Patent: Dec. 8, 1992

[54] THREE-DIMENSIONAL DECORATION AND METHOD OF ATTACHMENT

[76] Inventor: Gregory R. Sander, 2108 Neilson Way, Santa Monica, Calif. 90405

[21] Appl. No.: 709,334

[22] Filed: Jun. 3, 1991

[51] Int. Cl.$^5$ ............................ B32B 3/14; B32B 3/16
[52] U.S. Cl. ................... 428/79; 428/913.3; 428/542.2
[58] Field of Search ............... 428/79, 346, 347, 349, 428/913.3, 542.2

[56] References Cited

U.S. PATENT DOCUMENTS

| | | | |
|---|---|---|---|
| 2,859,152 | 11/1958 | Markus et al. | 428/79 X |
| 3,548,528 | 12/1970 | Belokin, Jr. | 428/913.3 X |
| 4,591,521 | 5/1986 | Freno et al. | 428/16 X |
| 4,631,210 | 12/1986 | McGee et al. | 428/13 |
| 4,772,503 | 9/1988 | Donsky | 428/16 X |
| 4,815,149 | 3/1989 | Erhardt et al. | 428/79 X |

*Primary Examiner*—George F. Lesmes
*Assistant Examiner*—D. R. Zirker
*Attorney, Agent, or Firm*—Roger A. Marrs

[57] ABSTRACT

A fabric or leather backing is employed for mounting and supporting a three-dimensional decoration composed of material such as Latex, plastic, rubber or the like. The decoration terminates at its backside of rear with a continuous edge on which an attachment flange is provided followed by placing a first bead of flowable, bondable or adhesive material thereon optionally followed by placing a second bead when the first bead has somewhat cured. The first and/or second bead is impregnated into the fabric or leather backing. Curing occurs within a specified period of time at a specified temperature range. Bonding of the decoration is complete after adhesive curing.

For vinyl or other plastic material, no adhesive is used. The plastic material that the decoration is made of becomes the adhesive through a melting process. The melting point of vinyl and many other plastics are less than the burning or damaging point of the material a garment is made of such as cotton. A decoration is made out of vinyl-type material with a flange at its rear, which is used for the attachment to the fabric. The decoration is placed on top of the material with a heating element under the material. The plastic flange is partially melted and forms an adhesive with the fibers of the material; thereby bonding the plastic decoration to the material.

1 Claim, 1 Drawing Sheet

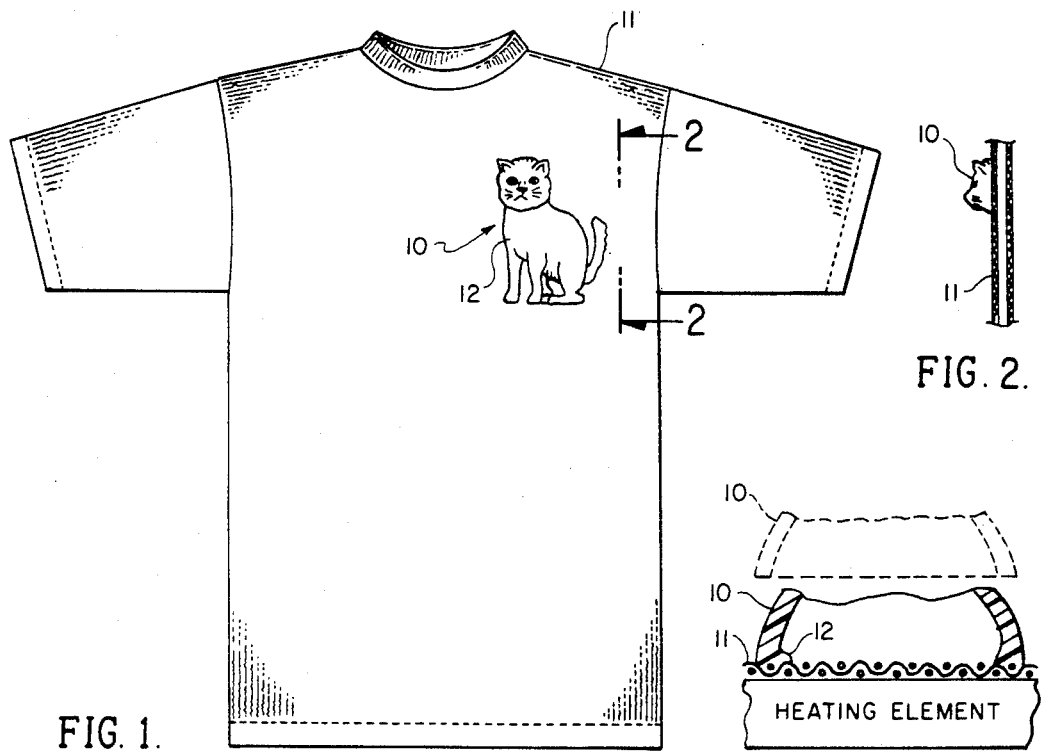
FIG. 1.
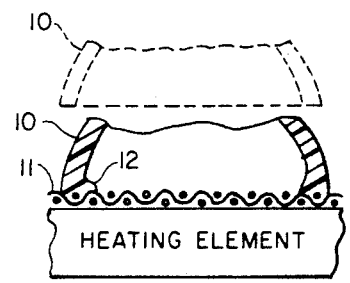
FIG. 2.
FIG. 6.
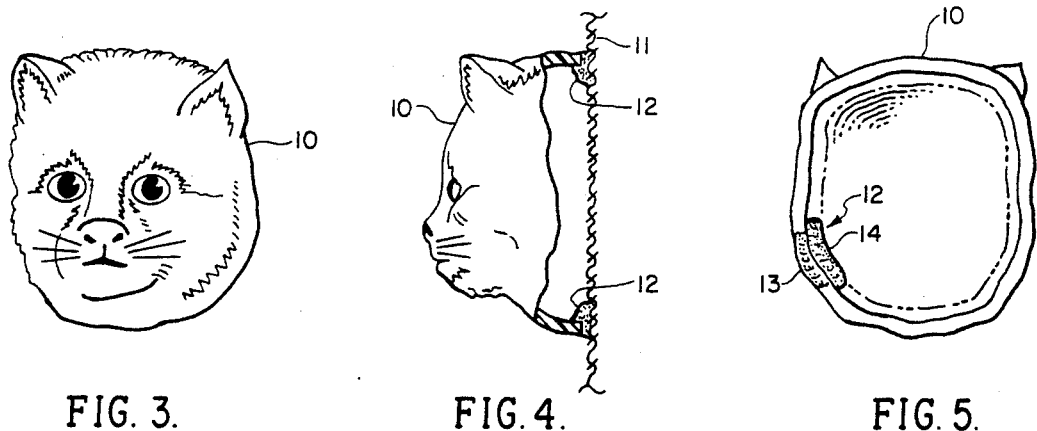
FIG. 3.  FIG. 4.  FIG. 5.

THREE-DIMENSIONAL DECORATION AND METHOD OF ATTACHMENT

BACKGROUND OF THE INVENTION

1. Field of the Invention

The present invention relates to the field of decorative items, and more particularly to a novel article of manufacture such as a T-shirt, leather jacket or the like, which is worn with a 3-dimensional decoration in such a manner as to be permanently affixed.

2. Brief Description of the Prior Art

In the past, it has been the conventional practice to decorate articles of manufacture such as T-shirts, leather jackets or the like by painting, sewing, embroidering or in more recent times, sewing or gluing decorative articles to the outer surface of the garment. Problems and difficulties have been encountered when employing sewing or gluing techniques inasmuch as the decorative item sometimes is damaged or separated from the garment during washing procedures or cleaning procedures. This is due primarily to the fact that in the case of threads for sewing, the threads may be severed or may become old and fatigued so that the article will fall off. With respect to gluing, washing procedures normally cause the glue to be emulsified or weakened so that the decoration will not remain in its proper location.

Therefore, a long-standing need has existed to provide a novel article of manufacture which will retain the decorative item in such a manner that it will withstand rough handling such as encountered when the garment or article is subjected to washing or cleaning procedures. The decorative article and its attaching means should be impervious to chemical weakening and should resist bending and pulling as the article of manufacture is worn or used.

SUMMARY OF THE INVENTION

In accordance with the present invention, a unique article of manufacture and method is presented for placing 3-dimensional decorations on the external surface of a backing, such as a shirt or leather jacket, which includes a decorative item of 3-dimensional configuration which terminates rearwardly with a continuous edge having an attachment flange with an added buildup of beads such as a first and/or second bead composed of a flowable and bondable material. Initially, a first bead is applied to the exposed edge of the decorative item and as the bead flows inwardly, a second bead is applied to the first bead so that it merges or flows therewith and when cured, forms an integral inwardly facing flange with the decorative item. While the first and second beads are in a flowable state, the decorative item is applied to a specific location on a backing, such as a fabric garment or a leather jacket or the like, so that the adhesive or bondable material composed of the beads will contact and impregnate with the backing. A specified period of time is employed at a given temperature for curing the bond of the flange material to the respective backing.

Therefore, it is among the primary objects of the present invention to provide a novel means for applying a decorative item directly to the external surface of a backing, such as a T-shirt, leather jacket or the like so that the decorative item will not be readily dislodged during washing or wearing procedures.

Another object of the present invention is to provide a novel 3-dimensional decoration suitable for application on the surface of a garment, such as a T-shirt, wherein a bondable adhesive is employed that impregnates the fibers or material of the backing to provide a permanent retention so that the decorative item cannot be dislodged during chemical cleaning or mechanical washing.

Another object of the present invention is to provide an inexpensive and readily producible decorative item that may be placed onto the surface of a backing in such a manner that the inner facing bond adheres to the decorative item and to the backing so as to prevent dislodgement or fatiguing of the bond during cleaning, wearing or undue handling.

Another object resides in providing a flanged decorative item of plastic or plastic-like composition that may be heated to adhere directly onto a backing such as fibers or the like.

Still an object is to install a decorative item onto a backing so that the item and its attachment means cannot be separated or torn from the backing or will not lose its aesthetic appeal through cleaning, wear or handling.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood with reference to the following description, taken in connection with the accompanying drawings in which:

FIG. 1 is a front elevational view of a T-shirt on which the decorative item of 3-dimensional configuration is attached using the method of the present invention;

FIG. 2 is a transverse cross-sectional view of a portion of the article of manufacture such as the shirt shown in FIG. 1 as taken in the direction of arrows 2—2 thereof;

FIG. 3 is an enlarged perspective view of another version of the invention wherein a single head representing the 3-dimensional character is applied, as shown in FIGS. 1 and 2, to the external surface of the article of manufacture;

FIG. 4 is a side elevational view, partly in section, of the 3-dimensional decorative item shown in FIG. 3 as applied to the backing by the bondable material forming the flange at the rear of the decorative item;

FIG. 5 is a rear view showing the formation of the flange about the terminating edge of the decorative item;

FIG. 6 is a transverse cross-sectional view of another version of the present invention.

DESCRIPTION OF THE PREFERRED EMBODIMENT

Referring to FIG. 1, the novel 3-dimensional decorative item of the present invention is illustrated in the general direction of arrow 10 and the decorative item is shown attached to the external or outer surface of a shirt, such as a fabric T-shirt 11. Immediately beneath the decorative item 10, there may be additional graphic material that is applied by employing screen printing or the like, and is illustrated by numeral 12.

Referring to FIGS. 2 and 3, decorative item 10 is illustrated attached to the outer surface 11 of the shirt by the method of the present invention and FIG. 3 shows that the decorative item 10 is of a 3-dimensional configuration. It is to be understood that any configuration or geometrical figure can be employed and that the present invention is not limited to the use of a cat's head or any particular graphics.

As shown in FIG. 4, the decorative item 10 is secured to the fibers of the fabric comprising the shirt 11 by means of a bondable composition 12 which forms an inwardly facing flange connecting the edge at the rearmost portion of the decorative item 10. It can be seen that the bondable material or adhesive material 12 is impregnated into the fibers of the fabric and that the attachment is integral with respect to the edge of the decorative item and the fabric itself.

Referring now to FIG. 5, it can be seen that the flange 12 is formed by initially providing a bead of material 13 in direct engagement with the rearmost edge of the decorative item followed by applying a second bead 14 over the first bead 13. The two beads eventually merge together adding to the flange 12 and after curving, when connected tot he backing, for a permanent bond.

FIG. 6 illustrates an alternate method of adhering the decorative item 10 to the backing 11 which takes the form of applying pressure to the decorative items and under heat for a period of time in order to provide a heat-sealed attachment between the edge and the fabric of the backing. A flange 12 is provided to effect the attachment. For vinyl or other plastic material, no adhesive is used. The plastic material that the decoration is made of becomes the adhesive through a melting process. The melting point of vinyl and many other plastics is less than the burning or damaging point of the material a garment is made of such as cotton. A decoration is made out of a vinyl-type material with a flange at its rear, which is used for the attachment to the fabric. The decoration is placed on top of the material with a heating element under the material. The plastic flange is partially melted and forms an adhesive with the fibers of the material; thereby bonding the plastic decoration to the material.

In actual practice it is found best that the decorative item 10 be composed of a compound such as Latex, vinyl, plastic or rubber and that the backing material be of a fabric such as cloth or a leather as used in leather jackets. Once the beads have been placed on the edge of the decorative item and placed in engagement with the surface of the backing, the bondable or attaching composition can be cured at room temperature between 30 to 60 minutes. If it is desired to decrease curing time, heated air may be blown across the decorative item and the adhesive attachment means for about 8 to 15 minutes at a temperature of about 125 degrees. However, it is to be understood that a full cure requires about 12 hours. The initial curing develops a surface skin first so that the article can be handled. No curing time required for plastic if adhesive done by heater process.

When applying the first bead along the continuous edge of the decorative item, the material of the bead flows inside and turned, flows back onto the edge to form the flange. The second bead is almost immediately placed on top of the first bead, followed by connection with the backing material.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. In a decorative article including a backing and a preformed decoration, the combination comprising:
   said decoration of three-dimensional construction composed of latex material having a terminating continuous edge for attachment to said backing;
   said decoration further having a flange of Latex material carried on said continuous edge extending inwardly behind said decoration defining a first bead of latex attachment material;
   said first bead characterized as merging into an integral construction forming said flange composed of a resilient latex material;
   said backing is fibrous fabric;
   a second bead of latex attachment material carried on said first bead directly engageable with said backing;
   said second bead being characterized as merging into said integral construction forming said flange and composed of latex material identical to said first bead;
   said second bead bonds with fibers of said fabric to provide an integral attachment; and
   said decoration material and said attachment material having the same and identical latex composition.

* * * * *